G. W. WHIPPLE.
Powder-Flask and Charger.
No. 28,134. Patented May 1, 1860.
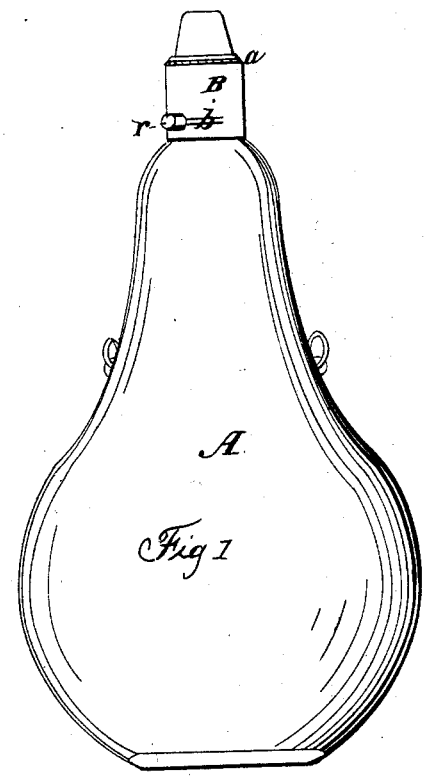
Fig. 1
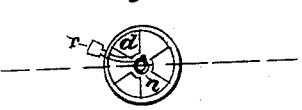
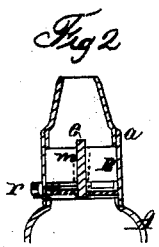

UNITED STATES PATENT OFFICE.

GEO. W. WHIPPLE, OF WEST ACTON, MASSACHUSETTS, ASSIGNOR TO H. ROWELL & CO., OF SAME PLACE.

IMPROVEMENT IN POWDER-FLASKS.

Specification forming part of Letters Patent No. 28,134, dated May 1, 1860.

*To all whom it may concern:*

Be it known that I, GEO. W. WHIPPLE, of West Acton, in the county of Middlesex and State of Massachusetts, have invented an Improved Gate or Cut-Off for the Chargers of Powder-Flasks, of which the following is a full, clear, and exact description, reference being had to the accompanying drawings, making part of this specification, in which—

Figure 1 is a view of a powder-flask having my improvements attached; Fig. 2, a vertical section through the charger on line $x\,x$ of Fig. 3; Fig. 3, a plan of the charger with its top removed; Fig. 4, a view of the gate detached; Fig. 5, a plan of the bottom of the charger, the gate being removed.

The object of my present invention is to make a cheap, compact, and efficient cut-off or gate for powder-flasks; and my invention consists in a circular gate revolving within the charger itself, around a pivot central with the axis of the charger, and in a spiral spring coiled round the post on which the gate revolves, for the purpose of closing the gate when released from the hand of the person using it.

That others skilled in the art may understand and use my invention, I will proceed to describe the manner in which I have carried out the same.

In the said drawings, A is the flask; B, the charger, the top of which unscrews at $a$, (to have access to the parts within.) A slot, $b$, is cut through the side of the charger B. The bottom of the charger B (shown in plan, Fig. 5) is a disk, $d$, having portions $c$ cut away to form openings. A stout pin, $e$, Fig. 2, is secured to the center of the disk $d$, and rises from it into the middle of the charger. A valve or gate, $f$, (detached in Fig. 4,) is made of a suitable diameter to fit snugly, and revolves within the charger B. It has a hole, $i$, in its center to fit over the pin $e$, and has portions cut away at $g$. Corresponding with the opening $c$, its rim $l$ is turned up, as shown in Fig. 4, of a sufficient width to cover the slot in the charger B. The gate $f$ rests immediately on the bottom $d$ of the charger. A wire spring, $m$, is coiled round the pin $e$, above the gate $f$. One end of the wire is secured to the pin $e$, near its top. The other end extends laterally through a hole in the rim of the gate (shown at $s$, Fig. 4) and through the slot $b$ in the side of the charger, and has a button, $r$, secured on its end. The spring $m$ serves to keep the gate $f$ closed—that is, with the solid portions $n$ of the gate over the openings $c$ in the disk below it and also to press the two disks $f$ and $d$ together.

When the flask is turned upside down to fill the charger, and the cut-off is to be operated, the button $r$ is pressed toward the opposite end of the slot $b$. This revolves the gate against the resistance of the spring $m$, and brings the openings $g$ in the gate over the openings $c$ in the disk below it, allowing the powder to flow into the charger. When the button $r$ is released from the hand of the operator, the spring $m$ immediately closes the cut-off by revolving the gate $f$ a portion of a turn.

What I claim as my invention, and desire to secure by Letters Patent, is—

The above-described cut-off for powder-flasks, consisting, essentially, of the gate $f$, disk $d$, and spring $m$, operating substantially as specified.

GEO. W. WHIPPLE.

Witnesses:
BRADLEY STONE,
ANDREW HAPGOOD.